(12) United States Patent
Yamaoka et al.

(10) Patent No.: US 10,815,074 B2
(45) Date of Patent: Oct. 27, 2020

(54) CONVEYANCE APPARATUS, PRODUCTION LINE USING THE CONVEYANCE APPARATUS, AND METHOD OF CHANGING THE PRODUCTION LINE

(71) Applicant: KAWASAKI JUKOGYO KABUSHIKI KAISHA, Kobe-shi, Hyogo (JP)

(72) Inventors: Yasuhiro Yamaoka, Nagoya (JP); Koji Izumi, Toyonaka (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 149 days.

(21) Appl. No.: 16/090,916

(22) PCT Filed: Dec. 13, 2016

(86) PCT No.: PCT/JP2016/087083
§ 371 (c)(1),
(2) Date: Oct. 3, 2018

(87) PCT Pub. No.: WO2017/175420
PCT Pub. Date: Oct. 12, 2017

(65) Prior Publication Data
US 2019/0106283 A1 Apr. 11, 2019

Related U.S. Application Data

(60) Provisional application No. 62/318,349, filed on Apr. 5, 2016.

(30) Foreign Application Priority Data

Jun. 13, 2016 (JP) .................................. 2016-117403

(51) Int. Cl.
*B65G 47/91* (2006.01)
*B65G 47/90* (2006.01)
(Continued)

(52) U.S. Cl.
CPC ............ *B65G 47/907* (2013.01); *B65B 5/105* (2013.01); *B65B 35/16* (2013.01); *B65B 43/52* (2013.01);
(Continued)

(58) Field of Classification Search
CPC ...... B65G 15/24; B65G 41/00; B65G 41/006; B65G 47/1478; B65G 47/1485;
(Continued)

(56) References Cited

U.S. PATENT DOCUMENTS 5,190,434 A * 3/1993 Miura .................. B23P 19/001
414/416.11
7,240,465 B2 * 7/2007 Davi' ..................... B25J 9/1697
53/58
(Continued)

FOREIGN PATENT DOCUMENTS

JP H10-255829 A 9/1998
JP 2002-120117 A 4/2002
(Continued)

*Primary Examiner* — Gene O Crawford
*Assistant Examiner* — Keith R Campbell
(74) *Attorney, Agent, or Firm* — Oliff PLC

(57) ABSTRACT

A conveyance apparatus includes a conveyor configured to convey a workpiece, a support unit supporting the conveyor, and a work device which performs a work to the workpiece within a conveying range of the conveyor supported by the support unit.

16 Claims, 7 Drawing Sheets

(51) Int. Cl.
- *B65B 35/16* (2006.01)
- *B65G 15/24* (2006.01)
- *B65B 65/00* (2006.01)
- *B65B 59/04* (2006.01)
- *B65B 43/52* (2006.01)
- *B65B 5/10* (2006.01)
- *B65G 41/00* (2006.01)
- *B23P 21/00* (2006.01)
- *B65G 37/02* (2006.01)
- *B65B 43/56* (2006.01)

(52) U.S. Cl.
CPC ............ *B65B 59/04* (2013.01); *B65B 65/003* (2013.01); *B65G 15/24* (2013.01); *B65G 41/00* (2013.01); *B65G 41/006* (2013.01); *B23P 21/004* (2013.01); *B65B 43/56* (2013.01); *B65B 2220/14* (2013.01); *B65G 37/02* (2013.01); *B65G 2201/0202* (2013.01); *B65G 2203/0233* (2013.01); *B65G 2203/041* (2013.01); *B65G 2207/14* (2013.01)

(58) Field of Classification Search
CPC ......... B65B 5/105; B65B 35/16; B65B 35/18; B65B 43/52; B65B 43/56; B65B 59/04; B65B 65/003; B23P 21/004
See application file for complete search history.

(56) References Cited

U.S. PATENT DOCUMENTS

| | | | | |
|---|---|---|---|---|
| 8,549,818 | B2* | 10/2013 | Ehrat | B65B 35/36 53/237 |
| 8,668,078 | B2* | 3/2014 | Horn | B65G 47/261 198/606 |
| 8,721,252 | B2* | 5/2014 | Osada | B23P 19/001 414/267 |
| 8,905,222 | B2* | 12/2014 | Worz | B65G 47/268 198/440 |
| 9,278,810 | B2* | 3/2016 | Meyer | B65G 21/06 |
| 2014/0288707 | A1* | 9/2014 | Asahi | F16P 3/147 700/253 |
| 2015/0039126 | A1 | 2/2015 | Shiino et al. | |
| 2019/0076883 | A1* | 3/2019 | Njluland | B07C 5/38 |
| 2019/0369600 | A1* | 12/2019 | Lager | B25J 9/0093 |

FOREIGN PATENT DOCUMENTS

| | | |
|---|---|---|
| JP | 2014-180725 A | 9/2014 |
| KR | 10-2012-0009163 A | 2/2012 |
| WO | 2013/105900 A1 | 7/2013 |
| WO | 2013/157121 A1 | 10/2013 |

* cited by examiner

CONVEYANCE APPARATUS, PRODUCTION LINE USING THE CONVEYANCE APPARATUS, AND METHOD OF CHANGING THE PRODUCTION LINE

TECHNICAL FIELD

The present disclosure relates to a conveyance apparatus, a production line using the conveyance apparatus, and a method of changing the production line.

BACKGROUND ART

Conventionally, in production lines for producing food, cosmetics, electric appliances, etc., given works are performed by workers stationed along a conveyor to objects to be worked (hereinafter, referred to as "workpiece(s)") which flow on the conveyor to efficiently mass-produce products of single type. In recent years, in order to save manpower and improve work efficiencies, automation of works has been attempted by installing work devices, such as a robot or a servo device, which perform specific works instead of workers.

For example, Patent Document 1 discloses a robot system including a conveyor which conveys workpieces, such as substrates for electric devices, where telegraphic communication components are soldered in previous process(es), and an articulated robot which performs a given work, such as removing a masking tape from the workpiece conveyed on the conveyor.

REFERENCE DOCUMENT OF CONVENTIONAL ART

Patent Document

[Patent Document 1] WO2013/157121A1

DESCRIPTION OF THE DISCLOSURE

Problems to be Solved by the Disclosure

Meanwhile, a production line having once been built may necessarily be changed due to changes in the product, the production process, etc. In the production line which attempted the automation of works as described above, if the conveyor or the work device is moved with the change in the production line, it will be necessary to position the work device so that a given work can be performed to the workpieces on the conveyor. Thus, the change in the production line is troublesome.

Therefore, one purpose of the present disclosure is to provide a conveyance apparatus of which a production line can easily be changed, a production line using the conveyance apparatus, and a method of changing the production line.

SUMMARY OF THE DISCLOSURE

In order to solve the issue described above, a conveyance apparatus according to the present disclosure is provided, which includes a conveyor configured to convey a workpiece, a support unit supporting the conveyor, and a work device which performs a work to the workpiece within a conveying range of the conveyor supported by the support unit.

According to this configuration, since the conveyor and the work device are supported by the same or common support unit, the spatial relationship between the conveyor and the work device will not change even if the conveyance apparatus is moved upon changing the production line. Thus, the production line can be changed without positioning the work device with respect to the conveyor.

With the conveyance apparatus, a plurality of casters may be provided to the bottom of the support unit. According to this configuration, the conveyance apparatus can easily be moved.

The conveyance apparatus may include a visual sensor configured to detect the position of the workpiece conveyed by conveyor. According to this configuration, the work device can perform the work based on positional information obtained by the visual sensor.

With the conveyance apparatus, the support unit may include a first supporting part supporting the conveyor, and a second supporting part having an opposing surface that opposes to a conveying surface of the conveyor and supporting the work device by the opposing surface. According to this configuration, since the work device is supported by the opposing surface that opposes to the conveying surface of the conveyor, the work device and the conveyor are disposed to line up in a vertical direction, which results in reducing space in a lateral direction of the conveyance apparatus.

The conveyance apparatus may further include a control device provided to an upper part of the second supporting part of the support unit, and configured to control operation of the work device. According to this configuration, since the control device is provided to the upper part of the second supporting part of the support unit, it can prevent that water is poured on the control device when pouring water on the conveyor of the conveyance apparatus and a part below the conveyor to wash the conveyance apparatus.

Alternatively, the conveyance apparatus may further include a control device provided below the first supporting part of the support unit, and configured to control operation of the work device, and a waterproof cover covering the control device. According to this configuration, since the control device is covered by the waterproof cover, it can prevent that water is poured on the control device when pouring water on the conveyor of the conveyance apparatus and a part below the conveyor to wash the conveyance apparatus.

With the conveyance apparatus, a transparent cover that extends downwardly and covers the work device may be provided to the second supporting part. According to this configuration, since a workspace of the work device is covered by the transparent cover, the work situation of the work device can be confirmed through the transparent cover, and it can prevent that a person's hand, head, etc. enters into this workspace. Therefore, safety of the conveyance apparatus improves.

With the conveyance apparatus, a handle may be provided to the support unit. According to this configuration, the conveyance apparatus can easily be moved.

With the conveyance apparatus, the first supporting part may support a workpiece accommodating container accommodating a plurality of workpieces at one side in width directions of the conveyor, and the first supporting part is connected with the second supporting part through two pillars provided so as to be separated from each other in a conveying direction of the conveyor. According to this configuration, a worker can feed a workpiece into the workpiece accommodating container from between two pillars, or can take out a workpiece from the workpiece accommodating container.

With the above conveyance apparatus, the work device may be a parallel-link picking robot.

With the conveyance apparatus, the first supporting part may support a workpiece accommodating container accommodating a plurality of workpieces at one side in the width directions of the conveyor, and the work device may be configured to transfer the workpiece inside the workpiece accommodating container to the conveyor.

With the conveyance apparatus, the first supporting part may support the workpiece accommodating container accommodating the plurality of workpieces at one side in the width directions of the conveyor, and the apparatus further comprises a visual sensor configured to detect the position of the workpiece accommodated in the workpiece accommodating container. According to this configuration, the work device can perform the work based on the positional information obtained by the visual sensor.

With the conveyance apparatus, the first supporting part may support the workpiece accommodating container accommodating the plurality of workpieces at one side in the width directions of the conveyor, and the apparatus further comprises a feeder configured to supply the workpiece to the workpiece accommodating container. According to this configuration, the workpiece can automatically be supplied to the workpiece accommodating container.

In the above conveyance apparatus, the height from a lowermost part of the support unit to an entrance part of the conveyor may be shorter than the height from a lowermost part of the support unit to an exit part of the conveyor. According to this configuration, when a plurality of conveyance apparatuses are lined up, the transfer of the workpiece from a conveyor of a certain conveyance apparatus to a conveyor of another conveyance apparatus is ensured.

In the above conveyance apparatus, the length of the conveyor may fall within a range of 750 mm to 1250 mm. According to this configuration, since the conveyance apparatus is easy to be moved and the length is same degree as a range where the worker works, replacing with the conveyance apparatus provided with the conveyor with which the worker works is easy.

Further, a production line according to the present disclosure is provided, which has a conveying passage comprised of a plurality of lined-up conveyors, at least one of the plurality of conveyors may be the conveyor provided to the above conveyance apparatus.

In the production line described above, two adjacent conveyors among the plurality of conveyors may include an upstream conveyor located upstream in the conveying direction and a downstream conveyor located downstream in the conveying direction, an exit part of the upstream conveyor and an entrance part of the downstream conveyor are arranged so as to oppose to each other in the conveying direction, and the workpiece conveyed by the upstream conveyor may be transferred to the entrance part of the downstream conveyor from the exit part of the upstream conveyor.

A method of changing a production line according to another aspect of the present disclosure is provided, which is the method of changing the production line from a first production line provided with first conveyance apparatuses into a second production line having a different configuration. The method includes the step of replacing the first conveyance apparatus of the first production line with a second conveyance apparatus. The first conveyance apparatus is the conveyance apparatus of claim 1, the first production line has a plurality of conveyors, at least one of the plurality of conveyors of the first production line is a conveyor provided to the first conveyance apparatus, and the second conveyance apparatus has a conveyor configured to convey a workpiece and a support unit supporting the conveyor, without the work device being provided. The second production line has a plurality of conveyors, at least one of the plurality of conveyors of the second production line is a conveyor provided to the second conveyance apparatus, and a conveyor length of the second conveyance apparatus is equal to a conveyor length of the first conveyance apparatus, and an installation height of the conveyor in the second conveyance apparatus is equal to an installation height of the conveyor in the first conveyance apparatus. According to this method, a part of the production line in which the work device works can be replaced by a part in which a person works or a part only transferring to the subsequent process.

A method of changing a production line according to another aspect of the present disclosure is provided, which is the method of changing the production line from a first production line provided with first conveyance apparatuses into a second production line having a different configuration. The method includes the step of replacing the first conveyance apparatus of the first production line with a second conveyance apparatus. The first conveyance apparatus includes a conveyor configured to convey a workpiece and a support unit supporting the conveyor, without the work device being provided, and the first conveyance apparatus is the conveyance apparatus of claim 1. The first production line has a plurality of conveyors, at least one of the plurality of conveyors of the first production line is a conveyor provided to the first conveyance apparatus, the second conveyance apparatus is the conveyance apparatus of claim 1, the second production line has a plurality of conveyors, and at least one of the plurality of conveyors of the second production line is a conveyor provided to the second conveyance apparatus. The conveyor length of the second conveyance apparatus is equal to a conveyor length of the first conveyance apparatus, and an installation height of the conveyor in the second conveyance apparatus is equal to an installation height of the conveyor in the first conveyance apparatus. According to this method, a part of the production line in which the work device works can be replaced by a part in which a person works or a part only transferring to the subsequent process.

Effect of the Disclosure

According to the present disclosure, the conveyance apparatus of which the production line can easily be changed, the production line using the conveyance apparatus, and the method of changing the production line can be provided.

MODE FOR CARRYING OUT THE DISCLOSURE

Figure 1:
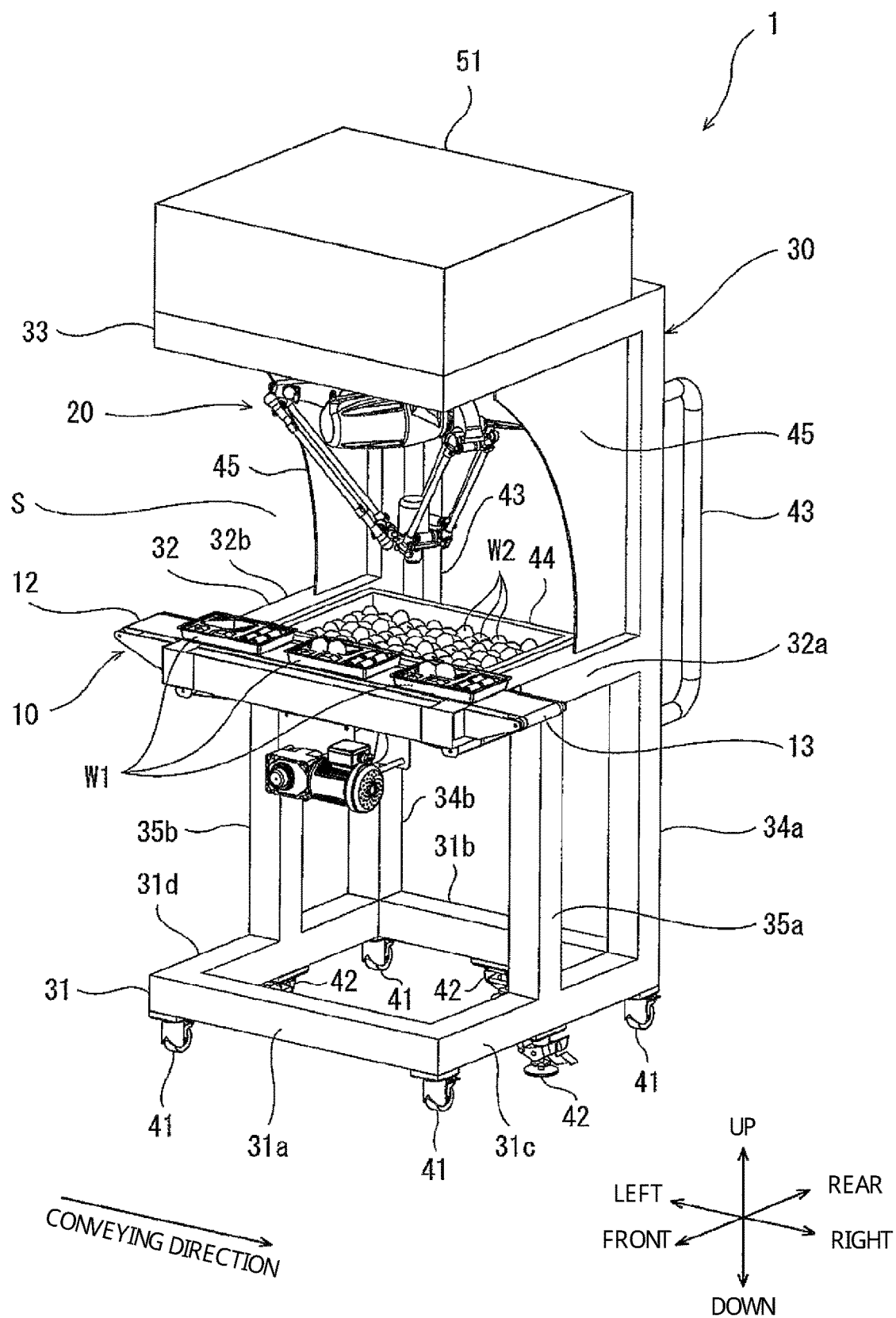
FIG. 1 is a perspective view of a conveyance apparatus according to one embodiment of the present disclosure.

Hereafter, one embodiment according to the present disclosure is described with reference to the drawings. Note that, in the following description, the same reference characters are assigned to the same or corresponding elements throughout the drawings to omit redundant description.
(Configuration of Conveyance Apparatus)

Figure 2:
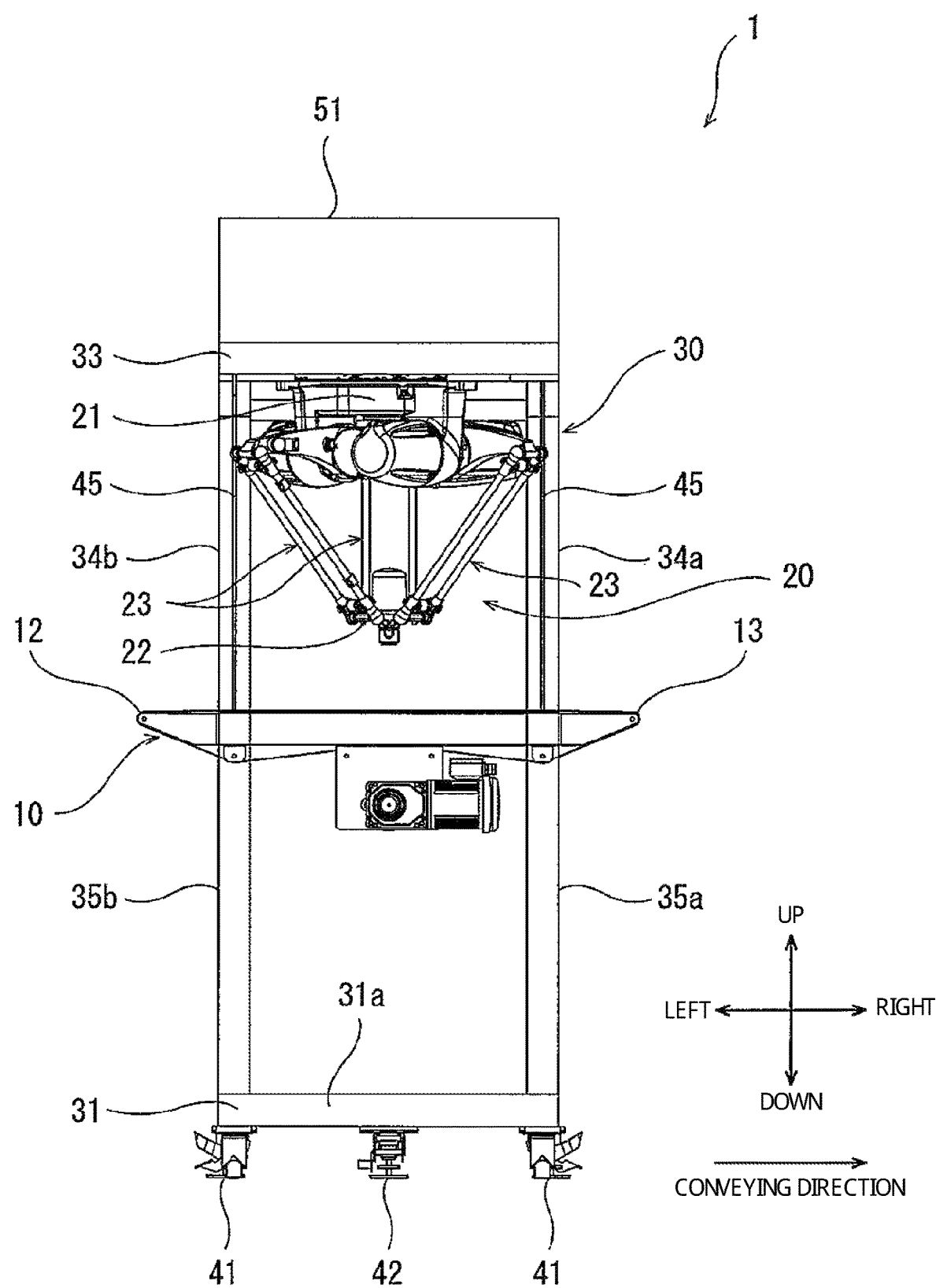
FIG. 2 is a front view of the conveyance apparatus illustrated in FIG. 1.
Figure 3:
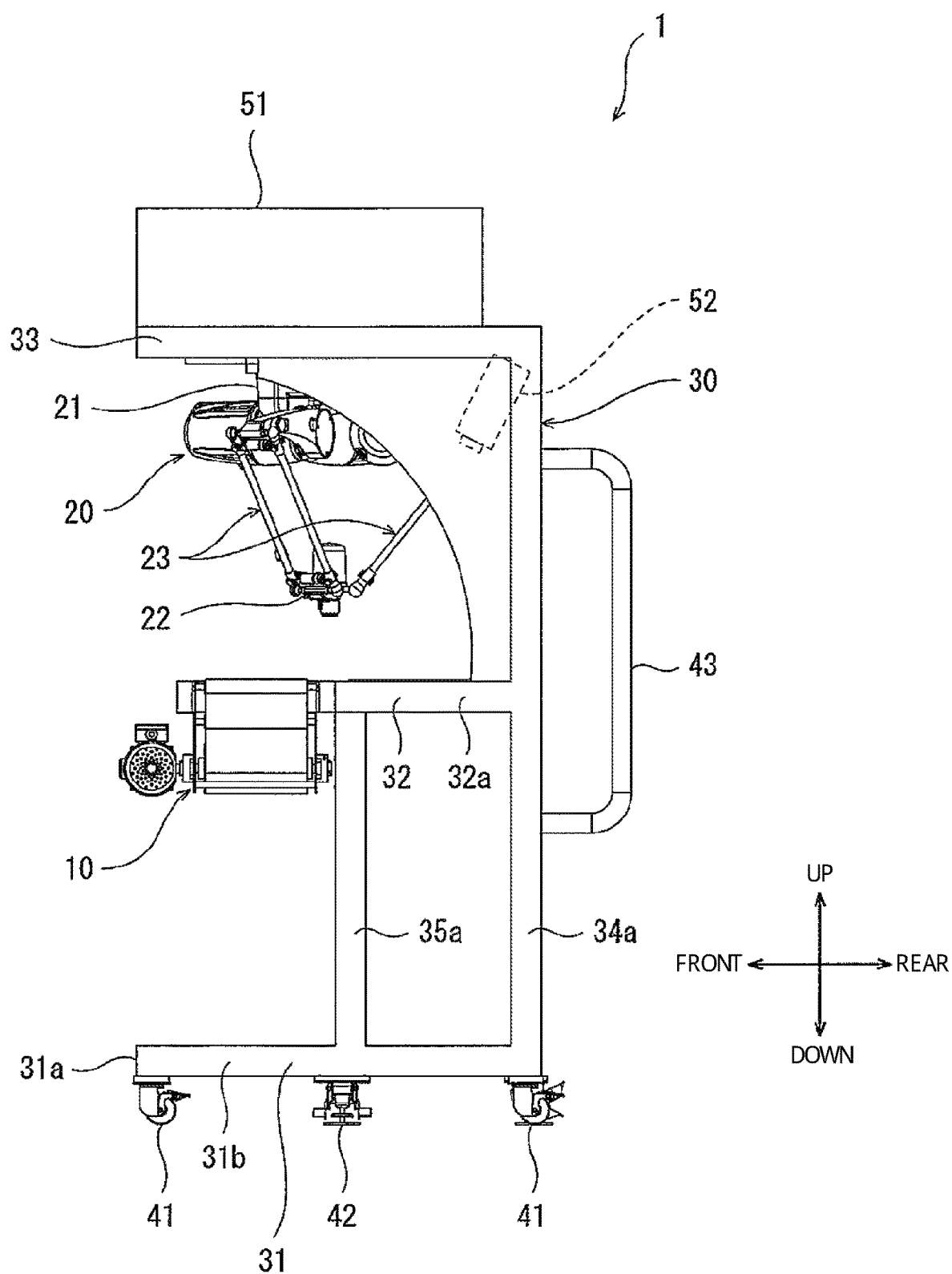
FIG. 3 is a side view of the conveyance apparatus illustrated in FIG. 1.
Figure 4:
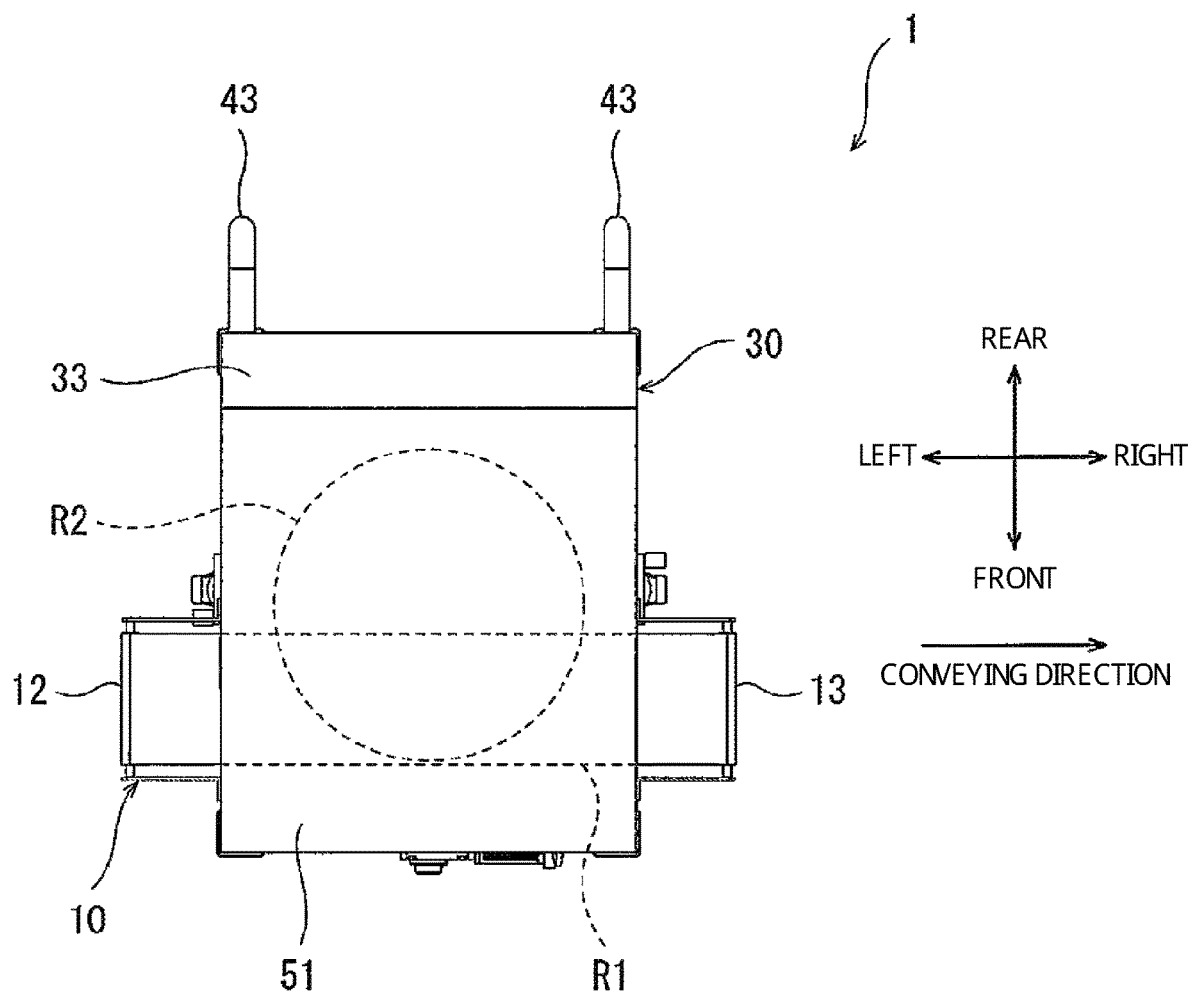
FIG. 4 is a top view of the conveyance apparatus illustrated in FIG. 1.

FIG. 1 is a perspective view of a conveyance apparatus 1 according to this embodiment of the present disclosure. FIG. 2 is a front view of the conveyance apparatus 1. FIG. 3 is a side view of the conveyance apparatus 1. FIG. 4 is a top view of the conveyance apparatus 1. In the following description, for convenience, in FIG. 2, leftward in the drawing sheet is described as "left," rightward as "right," upward as "top" or "up," downward as "bottom" or "low," closer as "front," and further as "rear." In addition, it is described that a workpiece W conveyed by the conveyance apparatus 1 is to be conveyed from the left to the right in the drawing sheet in FIG. 2.

As illustrated in FIG. 1, the conveyance apparatus 1 includes a conveyor 10 which conveys the workpiece W, a work device 20 which performs a given work to the workpiece W, and a support unit 30 which supports both the conveyor 10 and the work device 20. In the conveyance apparatus 1 of this embodiment, the work device 20 transfers a food product W2 into a container W1 conveyed by the conveyor 10. Below, when comprehensively referring to the container W1 and the food product W2, they are referred to as "the workpiece W."

First, the support unit 30 is described. The support unit 30 is a structure provided with a pedestal 31 placed on a floor surface, a first supporting part 32 provided above the pedestal 31, a second supporting part 33 provided above the first supporting part 32, two first pillars 34a and 34b which connect the supporting parts with the pedestal, and two second pillars 35a and 35b which connect the first supporting part 32 with the pedestal 31.

The pedestal 31 is located at the bottom of the support unit 30. The pedestal 31 is a frame body having substantially a rectangular shape in the plan view, and is comprised of a frame part 31a which extends, at the front side, horizontally in the left-and-right directions, a frame part 31b which extends, at the rear side, horizontally in the left-and-right directions, a frame part 31c which extends, at the left side, horizontally in the front-and-rear directions, and couples the frame parts 31a and 31b, and a frame part 31d which extends, at the right side, horizontally in the front-and-rear directions, and couples the frame parts 31a and 31b.

Four casters 41 are provided to the undersurface of the pedestal 31 so that the support unit 30 can easily be moved. Moreover, three legs 42 are provided to the pedestal 31, as fixing mechanisms which prevent the support unit 30 from moving by the casters 41 and fix the support unit 30 on the spot. In this embodiment, the three legs 42 are located in undersurfaces of the frame parts 31b, 31c and 31d, and are located at the center of the respective frame parts in extending directions thereof. Each leg 42 is constructed so as to be extendable and contractible in the vertical directions. When moving the support unit 30, each leg 42 is in a contracted state so that it does not contact the floor. On the other hand, when fixing the support unit 30 on the spot, the legs 42 carry out an extending operation to contact the floor and then lift the casters 41 from the floor. Thus, the support unit 30 is supported by the legs 42 and fixed on the spot. Note that the fixing mechanisms of the support unit 30 are not limited to the legs 42. For example, the fixing mechanism of the support unit 30 may be a stopper provided to the caster 41, which prevents rotation of the wheel of the caster 41. In this case, the leg 42 as the fixing mechanism of the support unit 30 may not be provided to the pedestal 31.

The first supporting part 32 is located at the center in the height directions of the support unit 30, and supports the conveyor 10. The first supporting part 32 has two frame parts 32a and 32b extending in the front-and-rear directions, which are provided so as to be separated from each other, and a flat-plate part (not illustrated) of a substantially rectangular shape in the plan view, suspended between these frame parts 32a and 32b. The first supporting part 32 supports the conveyor 10 provided so as to extend in the left-and-right directions, at front-end parts of the two frame parts 32a and 32b. Moreover, an upper surface of the flat-plate part of the first supporting part 32 is a work plane where the work device 20 (described below) uses it to work. That is, the first supporting part 32 also plays a role of a workbench of the work device 20. In this embodiment, a workpiece accommodating container 44 where a plurality of food products W2 are accommodated, is placed on the flat-plate part of the first supporting part 32. The workpiece accommodating container 44 accommodates the plurality of food products W2 in a bulk or random fashion. Note that the first supporting part 32 does not need to be provided with the flat-plate part, and in such a case, the workpiece accommodating container 44 may be supported by the frame parts 32a and 32b at both ends in the left-and-right directions.

The second supporting part 33 is located in an upper part of the support unit 30, and supports the work device 20. The second supporting part 33 is a plate-like body of a substantially rectangular shape in the plan view, extending in the horizontal directions. A control device 51 (described below) is placed on an upper surface of the second supporting part 33. An undersurface of the second supporting part 33 opposes to the conveying surface of the conveyor 10 supported by the first supporting part 32. Moreover, the work device 20 is provided to the undersurface of the second supporting part 33. A workspace S where the work device 20 works is provided between the first supporting part 32 and the second supporting part 33. The pedestal 31, the first supporting part 32, and the second supporting part 33 have substantially the same width in the left-and-right directions.

The two first pillars 34a and 34b are provided so as to be separated from each other in the conveying direction of the conveyor 10. The two first pillars 34a and 34b are provided to both end parts of the support unit 30 in the conveying direction of the conveyor 10, respectively. The two first pillars 34a and 34b extend in the vertical directions, and are connected to the pedestal 31, the first supporting part 32, and the second supporting part 33. In this embodiment, the first pillar 34a at the right side is connected to a right rear corner part of the pedestal 31, a right rear corner part of the first supporting part 32, and a right rear corner part of the second supporting part 33, while the first left side pillar 34b is connected to a left rear corner part of the pedestal 31, a left rear corner part of the first supporting part 32, and a left rear corner part of the second supporting part 33. Handles 43 which protrude rearwardly are provided to the two first pillars 34a and 34b, respectively. Note that the handles 43 may be provided to other parts of the support unit 30. The food product W2 is fed into the workpiece accommodating container 44, for example, through a space between the two first pillars 34a and 34b from rearward of the support unit 30.

The two second pillars 35a and 35b are provided so as to be separated from each other in the conveying direction of the conveyor 10. The two second pillars 35a and 35b are provided at both ends of the support unit 30 in the conveying direction of the conveyor 10, respectively. In this embodiment, the second pillar 35a at the right side connects, at the front side of the first pillar 34a, the frame part 31c of the pedestal 31 with the frame part 32a of the first supporting part 32, while the second pillar 35b at the left side connects, at the front side of the first pillar 34b, the frame part 31d of the pedestal 31 with the frame part 32b of the first supporting part 32.

The support unit 30 is provided with two side covers 45 which partially cover the workspace S from both sides. The side cover 45 is a thin flat plate and is connected to the first supporting part 32, the second supporting part 33, and the first pillar 34a or 34b.

The conveyor 10 extends in the left-and-right direction of the conveyance apparatus 1. In this embodiment, the conveyor 10 conveys the container W1 from the left to the right of the conveyance apparatus 1. Note that the conveying direction of the conveyor 10 is not limited to this direction. For example, the conveyor 10 may be constructed so that the container W1 is conveyed from the right to the left, or the conveying direction is switchable. Moreover, in this embodiment, the conveyor 10 is a conveyor belt. Note that the conveyors 10 may be other conveyors, such as a roller conveyor, for example. The conveyor 10 has an entrance part 12 which is an upstream end in the conveying direction, and an exit part 13 which is a downstream end in the conveying direction. As illustrated in FIG. 4, the conveyor 10 conveys the container W1 within a range (conveying range) R1 from the entrance part 12 to the exit part 13.

The length of the conveyor 10 in the conveying direction (left-and-right directions), i.e., the length of the conveying range R1 from the entrance part 12 to the exit part 13, is longer than the length of the support unit 30 in the left-and-right directions. That is, the entrance part 12 and the exit part 13 of the conveyor 10 are located outside a range between both edges of the support unit 30 in the left-and-right directions. Note that the length of the conveying range R1 may be the same as or shorter than the length of the support unit 30 in the left-and-right directions. In this embodiment, the length of the conveyor 10 in the conveying direction is within a range of 750 mm to 1250 mm.

The work device 20 performs a work to the workpiece W within the conveying range R1 of the conveyor 10. In this embodiment, the work device 20 is a delta type parallel link robot (hereinafter, simply referred to as the "robot"). In this embodiment, the robot 20 performs a picking work to transfer the food product W2 from the workpiece accommodating container 44 to the container W1 conveyed by the conveyor 10 from the upstream side.

The robot 20 includes a base 21, a bracket 22, and three sets of arm mechanisms 23. The base 21 is formed, for example, in a bucket shape, and is fixed to the undersurface of the second supporting part 33. The bracket 22 is formed, for example, in a substantially flat-plate shape, and a work tool (not illustrated) is removably attached to the undersurface of the bracket 22. Each arm mechanism 23 couples the bracket 22 to the base 21. The arm mechanisms 23 are driven by corresponding three actuators, respectively. Operation of the arm mechanisms 23, i.e., operation of the robot 20, is controlled by the control device 51. The control device 51 controls operation of the actuators according to a control program stored in a memory, thereby controlling the positions of the bracket 22 and the work tool attached thereto.

Note that FIG. 4 illustrates the moving range R2 of the work tool of the robot 20 in the plan view. The moving range R2 of the work tool is overlapped with the conveying range R1 of the conveyor 10. The robot 20 performs the work to the workpiece W at a given position (work position) in the overlapping part.

As illustrated in FIG. 3, a visual sensor 52 is provided to the support unit 30. In this embodiment, the visual sensor 52 is suspended from and supported by the undersurface of the second supporting part 33 at the rear side of the robot 20. Note that the supporting method and the supporting position of the visual sensor 52 are not limited to the structure. The visual sensor 52 detects the position of the container W1 conveyed by the conveyor 10, and the position of the food product W2 randomly loaded in bulk in the workpiece accommodating container 44. Positional information acquired by the visual sensor 52 is sent to the control device 51. The control device 51 operates the robot 20 based on the sent positional information so that the given work may be performed.

(Configuration of Production Line)

Figure 5:
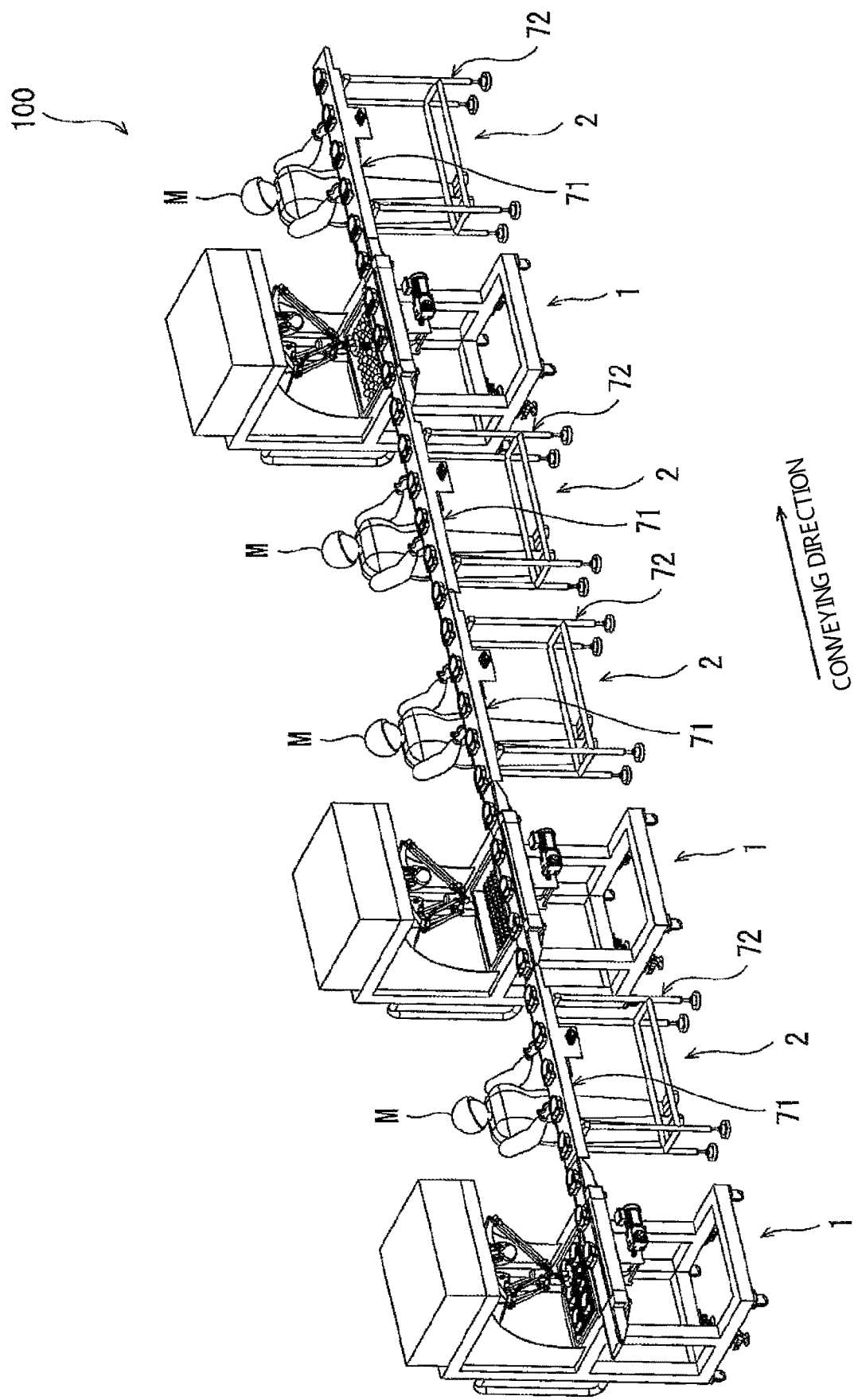
FIG. 5 is a view illustrating one example of a production line using the conveyance apparatus illustrated in FIG. 1.

Next, with reference to FIG. 5, a production line 100 using the conveyance apparatus 1 is described. FIG. 5 is a view illustrating one example of the production line 100 using the conveyance apparatus 1. In this embodiment, the production line 100 is a line for dishing up the container W1 as an object to be worked which is conveyed, with the food product W2 etc. as an object to be worked which is different from the container W1, and the line is constructed, for example, in a food factory etc.

As illustrated in FIG. 5, the production line 100 is comprised of a plurality of conveyance apparatuses (hereinafter, referred to as the "first conveyance apparatuses") 1 described above, and a plurality of conveyance apparatuses (hereinafter, referred to as the "second conveyance apparatuses") 2 which are different from the first conveyance apparatuses, so that the first and second conveyance apparatuses are lined up in a row. Unlike the first conveyance apparatus 1, the second conveyance apparatus 2 is not provided with the robot 20. The second conveyance apparatus 2 includes a conveyor 71 which conveys the workpieces W, and a support unit 72 which supports the conveyor 71. The installation height of the conveyor 71 in the second conveyance apparatus 2 is equal to the installation height of the conveyor 10 in the first conveyance apparatus 1. Moreover, the length of the conveyor 71 in the second conveyance apparatus 2 is equal to the length of the conveyor 10 in the first conveyance apparatus 1.

The first conveyance apparatus 1 in the production line 100 performs the given work to the workpiece W by the robot 20 provided to the first conveyance apparatus 1. Moreover, a worker M is stationed, for example, every second conveyance apparatus 2, near the second conveyance apparatus 2 in the production line 100. In the second conveyance apparatus 2, a given work is performed by the worker M to the workpiece W. Note that the worker M is not necessarily needed to be stationed at the second conveyance apparatus 2, and in such a case, the second conveyance apparatus 2 only plays the role to transfer the workpiece W to the subsequent process.

In the production line 100, one conveying passage is constructed so that the conveyors 10 of the plurality of first conveyance apparatuses 1 and the conveyors 71 of the plurality of second conveyance apparatuses 2 are lined up. Two adjacent conveyors among the conveyors 10 and 71 which constitute the conveying passage are arranged so that the exit part of the upstream conveyor and the entrance part of the downstream conveyor oppose to each other in the conveying direction. In addition, they are constructed so that the workpiece W being conveyed by the upstream conveyor is transferred to the entrance part of the downstream conveyor from the exit part of the upstream conveyor.

(Method of Changing Production Line)

Figure 6:
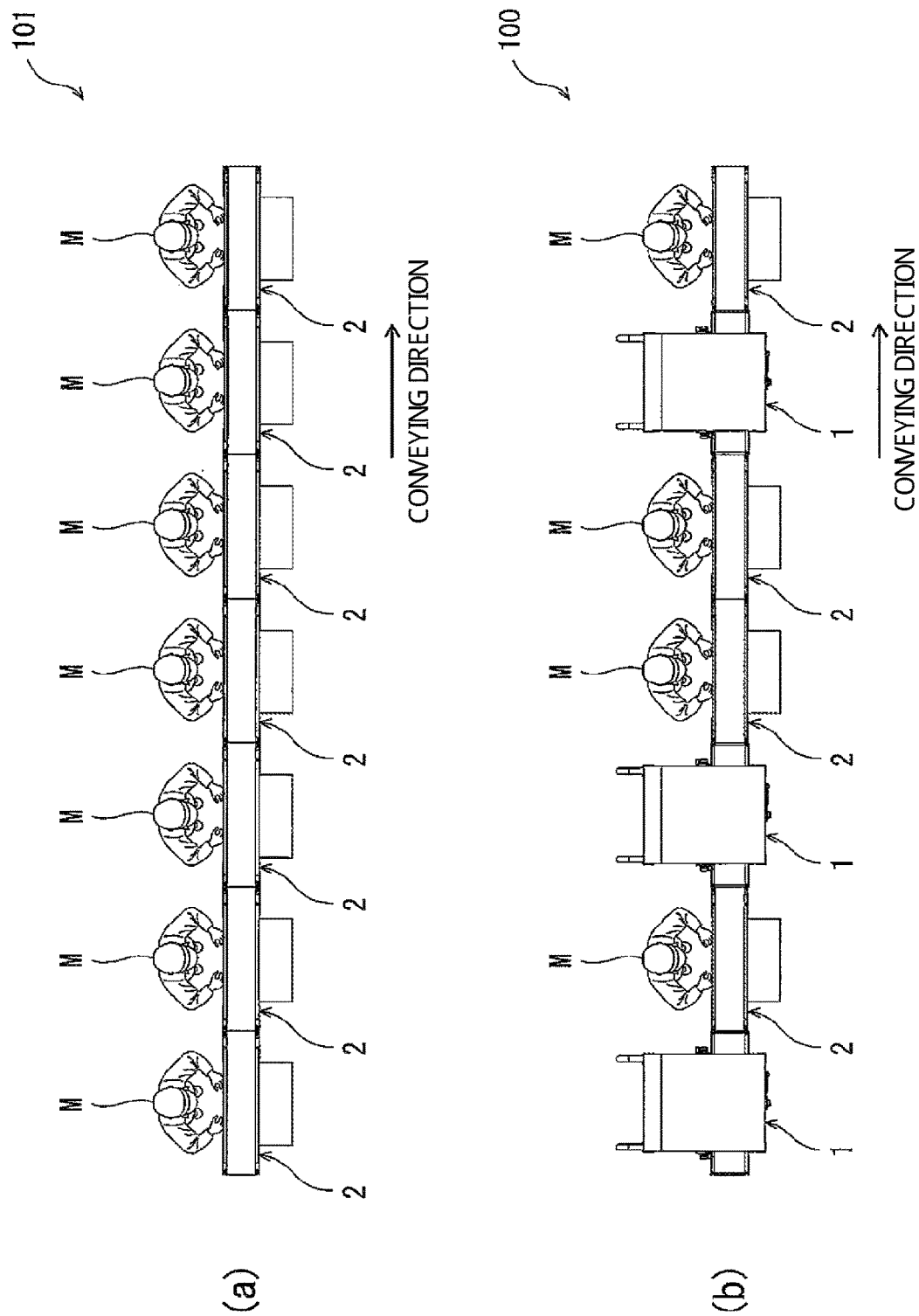
FIGS. 6(a) and 6(b) are views illustrating a method of changing the production line, where (a) is a top view of the production line before a change, and (b) is a top view of the production line after the change.

Next, one example of a method of changing the production line is described with reference to FIGS. 6(*a*) and 6(*b*). FIG. 6(*a*) is a top view of a production line 101 which is comprised only of the plurality of second conveyance apparatuses 2, without including any first conveyance apparatuses 1. FIG. 6(*b*) is a top view of the production line 100 comprised of the plurality of first conveyance apparatuses 1 and the plurality of second conveyance apparatuses 2.

The length of the conveyor 71 of the second conveyance apparatus 2 is equal to the length of the conveyor 10 of the first conveyance apparatus 1. Moreover, the installation height of the conveyor 71 of the second conveyance apparatus 2 is equal to the installation height of the conveyor 10 of the first conveyance apparatus 1. Thus, it is possible to change the production line from the production line 101 to the production line 100 only by replacing some second conveyance apparatuses 2 in the production line 101 with the first conveyance apparatuses 1. Conversely, it is possible to change the production line from the production line 100 to the production line 101 only by replacing the first conveyance apparatus 1 in the production line 100 with the second conveyance apparatus 2. Moreover, in the production line 100, it is possible to easily replace the conveyance apparatus(es) between the first conveyance apparatus(es) 1 and the second conveyance apparatus(es).

As described above, since in the conveyance apparatus 1 according to this embodiment the conveyor 10 and the robot 20 are supported by the same or common support unit 30, the spatial relationship between the conveyor 10 and the robot 20 will not change even if the conveyance apparatus 1 is moved upon changing the production line 100. Thus, the production line 100 can be changed without positioning the robot 20 with respect to the conveyor 10.

The present disclosure is not limited to the above embodiment, and various modifications may be possible without departing from the subject matter of the present disclosure.

For example, the configuration of the support unit 30 illustrated in the above embodiment is not limited to the configuration of the above embodiment, but it may suitably be changed without departing from the subject matter of the present disclosure. Moreover, the arrangement of the conveyor 10 and the work device 20 which are supported by the support unit 30 is not limited to the above embodiment, either. For example, although in the above embodiment the support unit 30 is provided with the first supporting part 32 which supports the conveyor 10, and the second supporting part 33 which is provided above the first supporting part 32 and is supported by the work device 20, for example, the support unit 30 may be provided with one supporting part which supports both the conveyor 10 and the work device 20. For example, the work device 20 may be supported by the flat-plate part of the first supporting part 32 which supports the conveyor 10. In this case, the support unit 30 may not be provided with the second supporting part 33.

Moreover, although in the above embodiment the length of the conveyor 10 is within the range of 750 mm to 1250 mm, it is not limited to this range and the length of the conveyor 10 may be outside the range of 750 mm to 1250 mm. However, the length of the conveyor 10 is desirable to be within the range of 750 mm to 1250 mm, in terms of the easiness of changing the space where the worker M works and the production line.

Moreover, the length of the conveyor 71 of the second conveyance apparatus 2 may differ from the length of the conveyor 10 of the first conveyance apparatus 1. However, since the change in the production line by replacing between the first conveyance apparatus(es) 1 and the second conveyance apparatus(es) 2 becomes easier, it is desirable to make the length of the conveyor 71 of the second conveyance apparatus 2 the same as the length of the conveyor 10 of the first conveyance apparatus 1.

Figure 7:
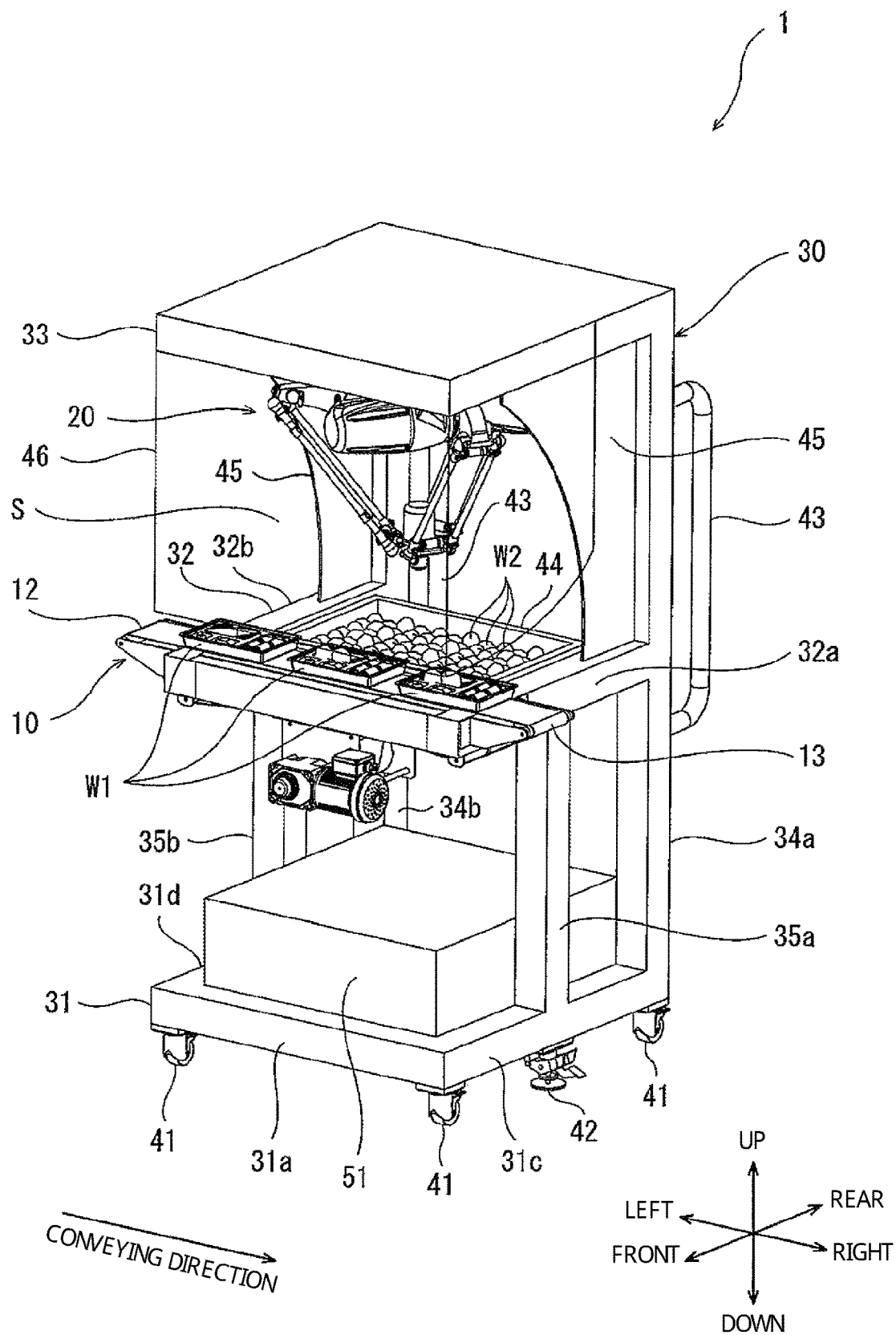
FIG. 7 is a view illustrating one modification of the conveyance apparatus illustrated in FIG. 1.

Moreover, in the above embodiment, although the control device 51 is placed on the upper surface of the second supporting part 33, it is not limited to this structure. For example, as illustrated in FIG. 7, the pedestal 31 may be formed in a flat-plate shape having a horizontal surface, and the control device 51 may be placed on the upper surface. In this case, the control device 51 may be covered with a waterproof cover. Since the control device 51 is installed at a lower location, the center-of-gravity position of the conveyance apparatus 1 becomes lower, thereby increasing the stability of the conveyance apparatus 1. Moreover, since the control device 51 is covered with the waterproof cover, it can prevent that water is poured on the control device 51 when pouring water on the conveyor 10 of the conveyance apparatus 1 and a part below the conveyor 10 to wash the conveyance apparatus 1.

Moreover, as illustrated in FIG. 7, a transparent cover 46 which covers the robot 20 may be provided to the support unit 30. For example, the transparent cover 46 is supported by the second supporting part 33, and extends downwardly from the second supporting part 33. Further, the transparent cover 46 and the conveying surface of the conveyor 10 are separated so that the workpiece W is transferable between adjacent conveyors. Since the transparent cover 46 can prevent that a person's hand, head, etc. enters into the workspace S of the robot 20, the safety of the conveyance apparatus 1 improves. The transparent cover 46 also improves hygiene of the workspace S of the robot 20.

Moreover, the conveyance apparatus 1 may be provided with a sensor which detects that the workpiece W is conveyed to a given position on the conveyor 10, in addition to or instead of the visual sensor 52. The conveyor 10 may also be controlled to stop when the sensor described above detects the workpiece W. While the sensor is detecting the workpiece W, the conveyor 10 may be controlled so that a paused state of the conveyor 10 is maintained until the robot 20 finishes the given work.

Moreover, the width of the entrance part 12 of the conveyor 10 may be wider than the width of the exit part 13 of the conveyor 10. Thus, if an upstream conveyor and a downstream conveyor of two adjacent conveyance apparatuses are somewhat offset in the position in the width directions of the conveyor 10, the positional offset is absorbable since the width of the entrance part 12 of the conveyor 10 is wide. Moreover, between the entrance part 12 of the conveyor 10 and the work position on the conveyor 10, a guide may be provided to position the workpiece W conveyed to the work position in the conveying direction at a desired position in the width directions.

Moreover, the conveyance apparatus 1 may be provided with a height adjustment mechanism which adjusts the heights of the conveyor 10 and the work device 20. For example, the conveyance apparatus 1 may be provided with a jack which raises and lowers the entire support unit 30. Alternatively, parts of the first pillars 34a and 34b below the first supporting part 32, and the second pillars 35a and 35b may be constructed so as to be extendable and contractible in the vertical directions, or the three legs 42 as the fixing mechanisms may function as the height adjustment mechanism.

Moreover, the height from the lowermost part of the support unit 30 to the entrance part 12 of the conveyor 10 may be shorter than the height from the lowermost part of the support unit 30 to the exit part 13 of the conveyor 10. In such a case, two adjacent conveyors 10 may be arranged so that their conveying ranges R1 overlap with each other in the plan view. For example, the conveying surface of the conveyor 10 may incline to a horizontal surface so that the exit part 13 is located above the entrance part 12. According to this structure, when a plurality of conveyance apparatuses are lined up, the transfer of the workpiece W from a conveyor of a certain conveyance apparatus to a conveyor of another conveyance apparatus is ensured.

The robot 20 may have a base, a gripper which grips an object, and at least one arm which couples the gripper to a robot main body, and the at least one arm and the base may be covered with a drape. Moreover, the conveyance apparatus 1 may be provided with a component fall prevention plate which prevents that a component of the work device 20 falls on the first supporting part 32. For example, the component fall prevention plate may be provided within a range which is located above the gripper, and overlaps with the workpiece accommodating container 44 when seen from above as the gripper comes above the container W1 conveyed by the conveyor.

The conveyance apparatus 1 may be provided with a plurality of conveyors. For example, the conveyance apparatus 1 may be provided with two rows of parallel conveyors, and the work device 20 may transfer the workpiece W conveyed by one of the two rows of conveyors to the other conveyor. For example, the work device 20 may transfer the food product W2 conveyed by one of the conveyors to the container W1 conveyed by the other conveyor.

The conveyance apparatus 1 may be provided with a plurality of work devices 20. That is, the plurality of work devices 20 may be supported by one support unit 30. In such a case, the support unit 30 may have one supporting part which supports the plurality of work devices 20, or may have a plurality of supporting parts which support the plurality of work devices 20, respectively. Moreover, if the conveyance apparatus 1 is provided with the plurality of work devices 20, the plurality of work devices 20 may be configured to perform different works. Moreover, the plurality of work devices 20 may be arranged in any other ways, as long as they are arranged so as to perform the works to the workpiece W within the conveying range R1 of the conveyor 10, respectively. For example, the plurality of work devices 20 may be arranged so as to be lined up in the conveying direction of the conveyor 10, or they may be arranged on both sides of the conveyor 10 in the width directions.

Moreover, a feeder may further be provided to automatically supply the food product W2 to the workpiece accommodating container 44.

A plurality of workpieces W may be randomly loaded in bulk in the workpiece accommodating container 44, or they may be placed at given positions, respectively, for example, the plurality of workpieces W are accommodated into a given lattice-shaped container, respectively. Moreover, in the above embodiment, although the workpiece accommodating container 44 is placed on the first supporting part 32, the workpiece accommodating container 44 does not need to be provided onto the first supporting part 32, and the workpiece W may be directly placed on the first supporting part 32, for example.

Moreover, although in the above embodiment the conveyance apparatus 1 in which the work device 20 transfers the food product W2 into the container W1 conveyed by the conveyor 10 is illustrated as one example, the picking work of the work device 20 is not limited to such a work. For example, like the conveyance apparatus 1 located at the upstream end of the production line 100 in FIG. 5, the work device 20 may be constructed so as to transfer the container W1 on the first supporting part 32 to the conveyor 10. Moreover, the work device 20 may transfer the workpiece W conveyed from upstream by the conveyor 10 to the work plane of the first supporting part 32. For example, when the conveyance apparatus 1 conveys the food product W2 by the conveyor 10, the work device 20 may be constructed so as to transfer the food product W2 conveyed from upstream by the conveyor 10 to a particular space within the container W1 placed on the work plane of the first supporting part 32 (i.e., a space for accommodating the food product W2).

Moreover, although the work device 20 of the above embodiment is a parallel link robot, it is not limited to this structure but various industrial robots may be applied thereto. For example, the work devices 20 may be a serial link robot, such as a horizontal articulated robot or a vertical articulated robot. Alternatively, the work devices 20 may be an articulated robot having a plurality of arms, such as a dual-arm robot. Moreover, the robot as the work device 20 is not limited to the picking robot, but, for example, the robot 20 may be a robot which performs a work, such as injecting, applying, etc. fluid material to the workpiece conveyed by the conveyor. Moreover, the workpiece W may not be limited to the container or the food, but, for example, it may be a machine component, an electronic component, etc.

Moreover, the work device 20 may be a device other than the industrial robot described above, as long as it is a device which performs the works to the workpiece W within the conveying range R1 of the conveyor 10. For example, the work device may be configured to be provided with a linear motion device, such as an electric cylinder, or a hydraulic or pneumatic cylinder. Moreover, the work device may be a servo device using an AC or DC servo motor, or a hydraulic or pneumatic device.

DESCRIPTION OF REFERENCE CHARACTERS

1 Conveyance Apparatus (First Conveyance Apparatus)
2 Conveyance Apparatus (Second Conveyance Apparatus)
10 Conveyor
20 Work Device
30 Support Unit
31 Pedestal
32 First Supporting Part
33 Second Supporting Part
34a, 34b First Pillar
35a, 35b Second Pillar
41 Caster
42 Leg
43 Handle 44 Workpiece Accommodating Container
45 Side Cover
46 Transparent Cover
100 Production Line (First Production Line)
101 Production Line (Second Production Line)

What is claimed is:

1. A conveyance apparatus comprising:
a conveyor configured to convey a workpiece;
a support unit including:
   a first supporting part supporting the conveyor, and
   a second supporting part having an opposing surface opposite to a conveying surface of the conveyor;
a work device supported by the opposing surface of the second supporting part and configured to perform a work to the workpiece within a conveying range of the conveyor; and
a control device disposed on an upper part of the second supporting part of the support unit, the control device being configured to control operation of the work device.

2. The conveyance apparatus of claim 1, further comprising a plurality of casters disposed on a bottom of the support unit.

3. The conveyance apparatus of claim 1, further comprising a visual sensor configured to detect a position of the workpiece as the workpiece is conveyed by the conveyor.

4. The conveyance apparatus of claim 1, further comprising a transparent cover extending downwardly and covering the work device, the transparent cover being disposed on the second supporting part.

5. The conveyance apparatus of claim 1, further comprising a handle disposed on the support unit.

6. A conveyance apparatus comprising:
a conveyor configured to convey a workpiece;
a support unit including:
   a first supporting part supporting the conveyor, the first supporting part supporting a workpiece accommodating container configured to accommodate a plurality of workpieces including the workpiece at one side in a width direction of the conveyor, and
   a second supporting part having an opposing surface opposite to a conveying surface of the conveyor, the first supporting part being connected to the second supporting part by two pillars so as to be separated from the second supporting part in a conveying direction of the conveyor; and
a work device supported by the opposing surface of the second supporting part and configured to perform a work to the workpiece within a conveying range of the conveyor.

7. The conveyance apparatus of claim 1, wherein the work device is a parallel-link picking robot.

8. A conveyance apparatus comprising:
a conveyor configured to convey a workpiece;
a support unit including:
   a first supporting part supporting the conveyor, the first supporting part supporting a workpiece accommodating container configured to accommodate a plurality of workpieces including the workpiece at one side in a width direction of the conveyor, and
   a second supporting part having an opposing surface opposite to a conveying surface of the conveyor; and
a work device supported by the support unit and configured to perform a work to the workpiece within a conveying range of the conveyor, the work device being configured to transfer the workpiece inside the workpiece accommodating container to the conveyor.

9. The conveyance apparatus of claim 8, further comprising a visual sensor configured to detect a position of the workpiece accommodated in the workpiece accommodating container.

10. The conveyance apparatus of claim 9, further comprising a feeder configured to supply the workpiece to the workpiece accommodating container.

11. A conveyance apparatus comprising:
a conveyor configured to convey a workpiece;
a support unit supporting the conveyor; and
a work device supported by the support unit and configured to perform a work to the workpiece within a conveying range of the conveyor,
wherein a height from a lowermost part of the support unit to an entrance part of the conveyor is less than a height from the lowermost part of the support unit to an exit part of the conveyor.

12. The conveyance apparatus of claim 1, wherein the length of the conveyor falls within a range of 750 mm to 1250 mm.

13. A production line comprising:
the conveyance apparatus of claim 1, and
a conveying passage including a plurality of lined-up conveyors, at least one of the plurality of conveyors being the conveyor of the conveyance apparatus.

14. The production line of claim 13, wherein:
the plurality of lined-up conveyors includes two adjacent conveyors being (i) an upstream conveyor located upstream in the conveying direction, and (ii) a downstream conveyor located downstream in the conveying direction, respectively,
an exit part of the upstream conveyor and an entrance part of the downstream conveyor are arranged opposite to each other in the conveying direction, and
the workpiece conveyed by the upstream conveyor is transferred to the entrance part of the downstream conveyor from the exit part of the upstream conveyor.

15. A method of changing a production line from a first production line provided with a first conveyance apparatus into a second production line having a configuration different from a configuration of the first production line, the method comprising the step of:
replacing the first conveyance apparatus of the first production line with a second conveyance apparatus, wherein:
   the first conveyance apparatus includes:
      a first conveyor configured to convey a workpiece;
      a first support unit supporting the first conveyor; and
      a work device supported by the support unit and configured to perform a work to the workpiece within a conveying range of the first conveyor,
   the first production line has a first plurality of conveyors, at least one conveyor of the first plurality of conveyors of the first production line being the first conveyor of the first conveyance apparatus,
   the second conveyance apparatus includes a second conveyor configured to convey a workpiece and a second support unit supporting the second conveyor, the second conveyance excluding a work device,
   the second production line has a second plurality of conveyors, at least one conveyor of the second plurality of conveyors of the second production line being the second conveyor of the second conveyance apparatus, and
   a conveyor length of the second conveyance apparatus is equal to a conveyor length of the first conveyance apparatus, and an installation height of the second conveyor is equal to an installation height of the first conveyor.

16. A method of changing a production line from a first production line provided with a first conveyance apparatus into a second production line having a different configuration different from a configuration of the first production line, the method comprising the step of:
  replacing the first conveyance apparatus of the first production line with a second conveyance apparatus, wherein:
    the first conveyance apparatus includes a first conveyor configured to convey a workpiece and a first support unit supporting the first conveyor, the first conveyance apparatus excluding a work device,
    the first production line has a first plurality of conveyors, at least one conveyor of the first plurality of conveyors of the first production line is the first conveyor of the first conveyance apparatus,
    the second conveyance apparatus includes:
      a second conveyor configured to convey a workpiece;
      a second support unit supporting the second conveyor; and
      a work device supported by the second support unit and configured to perform a work to the workpiece within a conveying range of the second conveyor,
    the second production line has a second plurality of conveyors, at least one conveyor of the second plurality of conveyors of the second production line is the second conveyor of the second conveyance apparatus, and
    a conveyor length of the second conveyance apparatus is equal to a conveyor length of the first conveyance apparatus, and an installation height of the second conveyor is equal to an installation height of the first conveyor.

* * * * *